United States Patent
Binkert et al.

(10) Patent No.: US 7,945,128 B1
(45) Date of Patent: May 17, 2011

(54) OPTICAL-BASED BARRIER SYNCHRONIZATION METHODS AND SYSTEMS FOR IMPLEMENTING THE SAME

(75) Inventors: Nathan Binkert, Redwood City, CA (US); Al Davis, Coalville, UT (US); Robert Schraiber, Palo Alto, CA (US); Dana Vantrease, Madison, WI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 78 days.

(21) Appl. No.: 12/258,674

(22) Filed: Oct. 27, 2008

Related U.S. Application Data

(60) Provisional application No. 61/067,678, filed on Feb. 29, 2008.

(51) Int. Cl.
*G02B 6/12* (2006.01)
*G02B 6/28* (2006.01)
*G02B 6/35* (2006.01)

(52) U.S. Cl. .............. 385/14; 385/24; 385/129; 385/16

(58) Field of Classification Search .................. None
See application file for complete search history.

(56) References Cited

U.S. PATENT DOCUMENTS

| | | | |
|---|---|---|---|
| 7,359,587 B2 * | 4/2008 | Beausoleil et al. | 385/14 |
| 7,529,437 B2 * | 5/2009 | Spillane et al. | 385/14 |
| 2006/0056758 A1 * | 3/2006 | Beausoleil et al. | 385/14 |
| 2008/0031296 A1 * | 2/2008 | Spillane et al. | 372/45.01 |

* cited by examiner

*Primary Examiner* — Sarah Hahm

(57) ABSTRACT

Various embodiments of the present invention are directed to optical-based barrier methods and systems for synchronizing processing of two or more threads. In one method embodiment of a barrier method, each thread can be processed by a different processing element. The method comprises transmitting a lightwave along a waveguide that is optically coupled to each of the processing elements. Each processing element that processes a thread turns on diverter capable of diverting substantially all of the lightwave from the waveguide. Each processing element that completes processing of a thread turns off a corresponding diverter. A barrier is reached when all of the processing elements have turned off the corresponding diverters and discontinued diverting a portion of the lightwave from the waveguide.

19 Claims, 15 Drawing Sheets

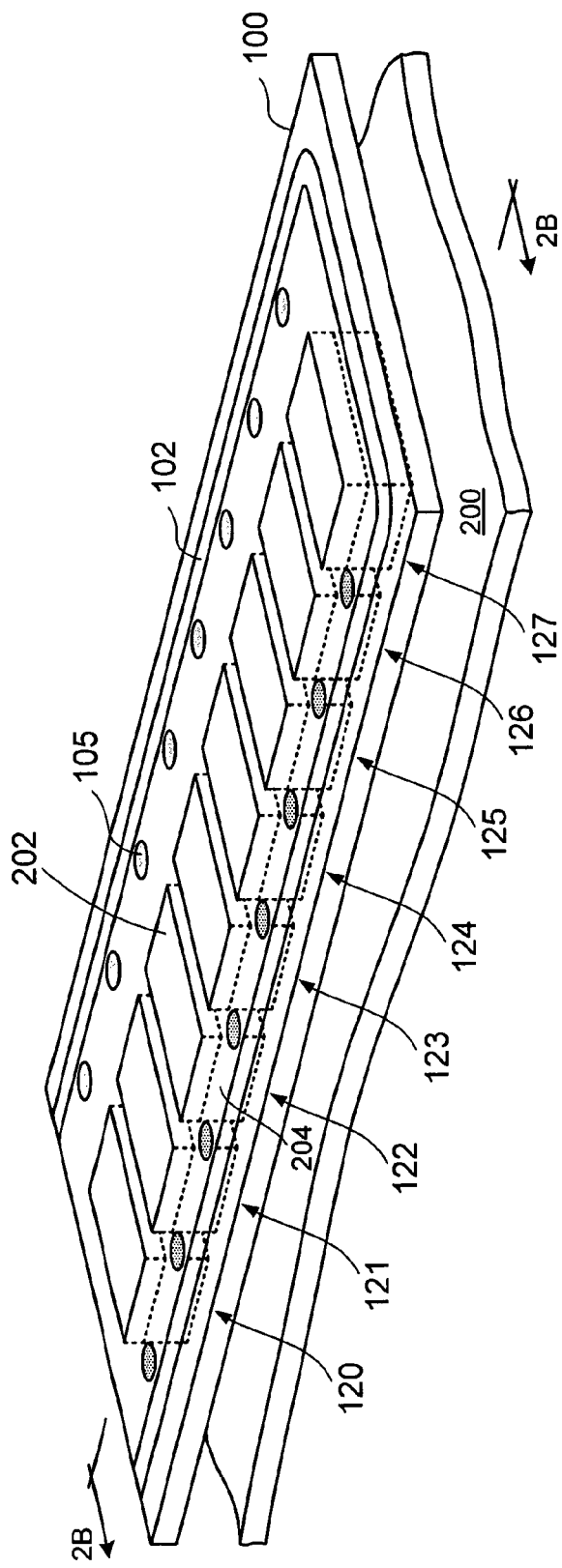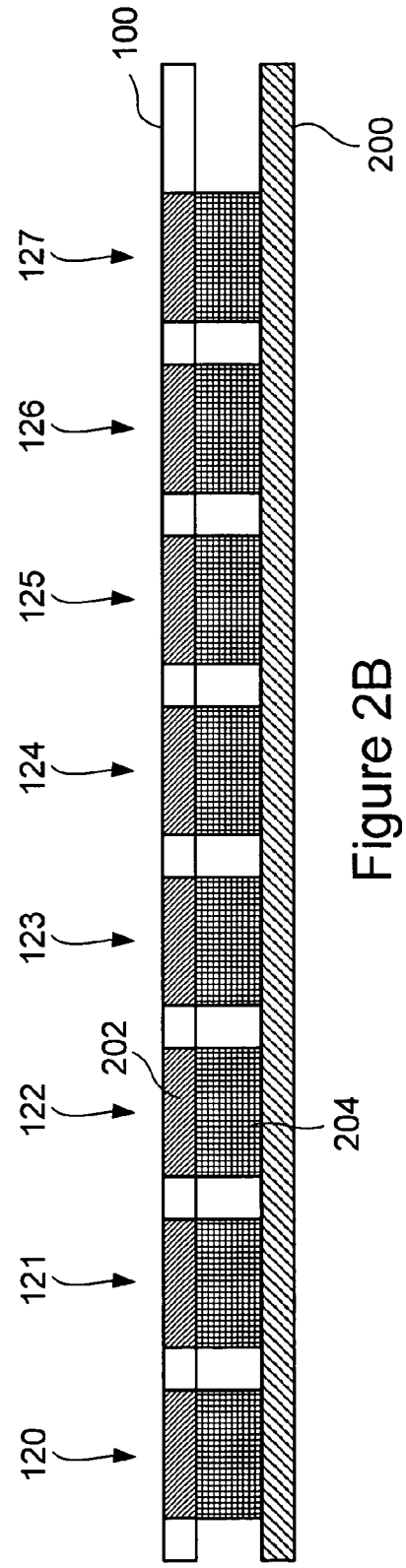
Figure 2A
Figure 2B

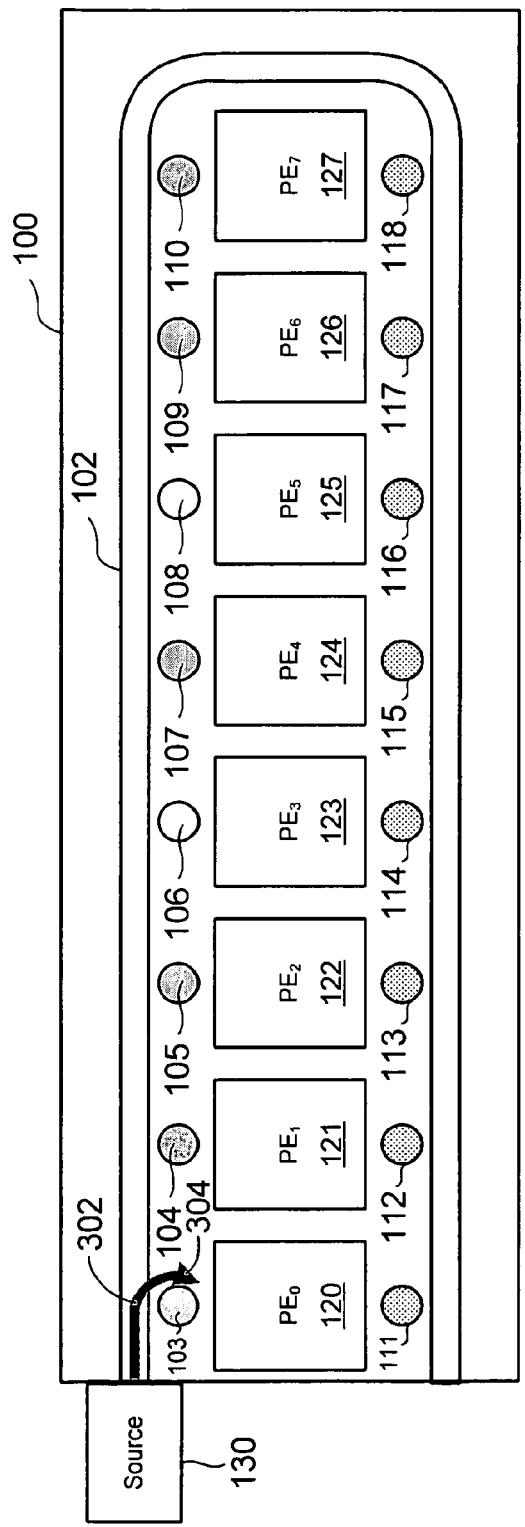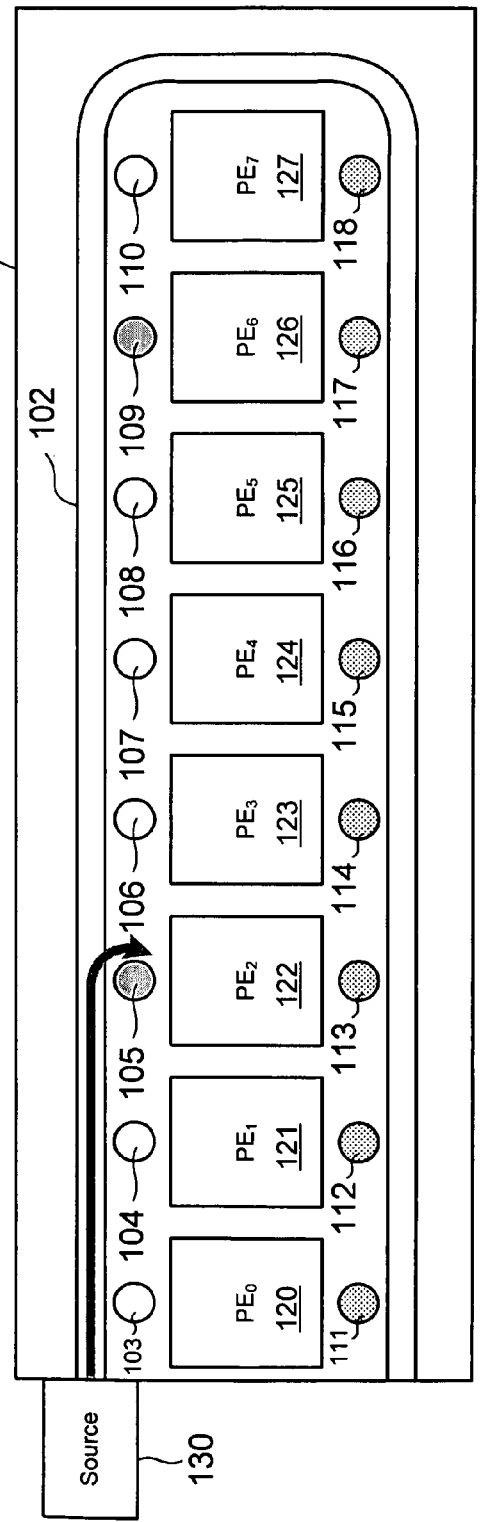
Figure 3B
Figure 3C

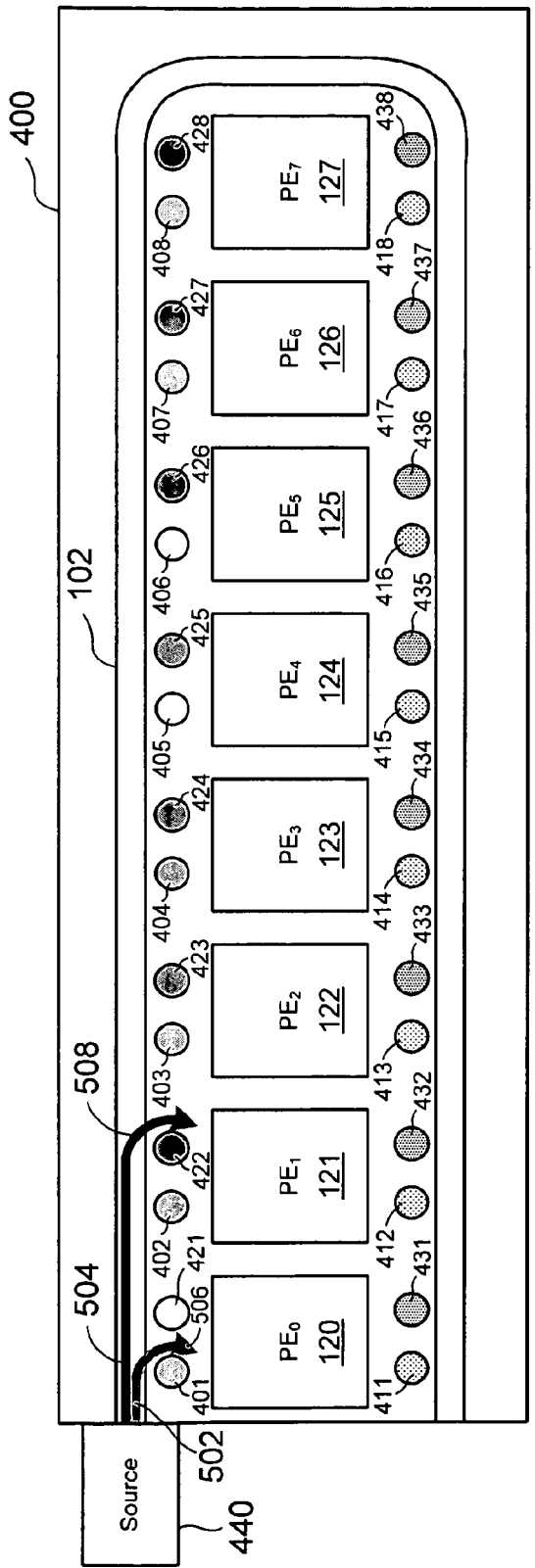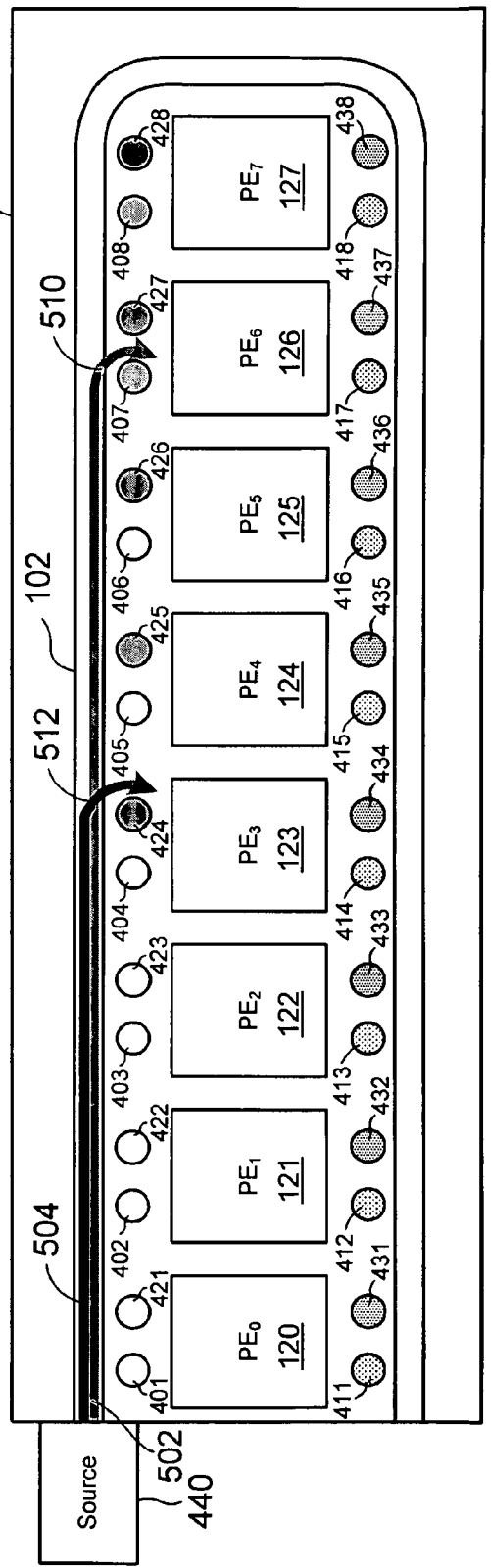
Figure 5B
Figure 5C

US 7,945,128 B1

OPTICAL-BASED BARRIER SYNCHRONIZATION METHODS AND SYSTEMS FOR IMPLEMENTING THE SAME

CROSS-REFERENCE TO RELATED APPLICATIONS

This Application claims the benefit of U.S. Provisional patent application Ser. No. 61/067,678, filed Feb. 29, 2008, which is hereby incorporated by reference in it's entirety.

TECHNICAL FIELD

Embodiments of the present invention are directed to optoelectronics, and, in particular, to methods for synchronizing execution of threads of multi-threaded programs and to optoelectronic systems for implementing these methods.

BACKGROUND

A thread is a process or basic unit of program execution that carries out a certain program function. Threads are a way for a program to split a process into two or more sub-processes that can be run simultaneously. Certain operating systems can run multiple threads of a multi-threaded program in parallel on a number of different processors allowing for fast execution of the program. Consider, for example, a program employed to numerically evaluate a definite integral $\int_a^b (f(x)+g(x))dx$, where f(x) and g(x) are continuous on the interval (a, b). The program can split the evaluation into two threads, where the first thread is run on a first processor to evaluate the integral $\int_a^b f(x)dx$, and the second thread is run simultaneously on a second processor to evaluate the integral $\int_a^b g(x)dx$. The results of the first and second threads are summed to obtain the value of the integral $\int_a^b (f(x)+g(x))dx$.

Multi-threaded programs are intrinsically composed of multiple concurrent threads of control. In order to achieve the intended behavior, two problems must be solved. One problem involves spatial synchronization of system resources, whereby mutually exclusive access of threads to certain shared resources may be guaranteed. This problem can be solved with locks. A lock is a synchronization mechanism for ensuring that there is, at any one time, no more that one thread using or modifying a resource in an environment where several threads of execution must use or modify several shared resources. The other problem involves temporal synchronization of thread phases. This problem is typically solved with barriers. In parallel computing, barriers are employed to synchronize execution of a set of threads. The processing of each thread in the set must stop at the barrier and cannot continue until all of the threads have reached the barrier. In other words, the barrier ensures that all participating threads must reach the barrier before any thread may advance past the barrier. Since a barrier is most often a form of global synchronization, the efficiency with which the barrier is processed extends the program's critical path. Large delays between the time the last thread reaches the barrier and when all threads receive notification that the barrier has been released can profoundly lengthen a program's execution time. There are numerous issues which exacerbate the problem. For example, complex programs may have many barriers operating at any given time, and as the number of threads and thread sets increases, the number of barriers and the number of individual barrier participants increases. Any shared physical resources that support these barriers will further increase barrier processing latency by reducing the number of barriers that the hardware can support in parallel. Hardware-based barrier solutions may only support a limited number of simultaneously outstanding barriers, which may further increase barrier processing latency. Additional problems due to the global nature of barrier processing involve the delay and the power consumed in signaling over long signal paths.

Software-based barrier solutions can be used to synchronize thread phases in a number of different applications, especially those that employ counters. However, their performance ultimately depends on the underlying computer architecture's structure and behavior. Physical components, such as the communication network and memory hierarchy, and architectural policies, such as cache coherence and memory consistency, can play a large and often unpredictable role in the performance of software-based barriers.

On the other hand electrical hardware-based solutions requiring a dedicated barrier interconnect-network have been proposed and built. See "Distributed Hardwired Barrier Synchronization for Scalable Multiprocessor Clusters," by S. Shang, *IEEE Trans on Parallel and Distributed Systems*, Vol. 6, No. 6, June 1995. Binary trees and AND gates often perform better than their software counterparts. Each leaf of the tree corresponds to a processing element ("PE"), and the expense of building the tree topology, either embedded in another existing interconnect or in an entirely separate interconnect, can be cost prohibitive.

An optical-based barrier solution has been proposed as an alternative to electrical hardware-based barrier solutions because lightwaves suffer from significantly less signal loss and distortion over longer distances than do electrical signals. For example, in "A Distributed Hardware Barrier in an Optical Bus-Based Distributed Shared Memory Multiprocessor," by M. H. Davis Jr. and U. Ramachandran, *Proc. 1992 Int'l Conf. Parallel Processing*, Vol. 1 pp. 228-231, August 1992, the authors proposed that each PE broadcasts onto a designated optical waveguide bus when it reaches a barrier. All participating PEs snoop the buses, using the PE-to-bus assignment to appropriately identify a PE and fill in a PE-private electrical barrier trees. However, the hardware requirements of this approach may be prohibitive. For a given barrier instance, each PE requires its own barrier tree and broadcast waveguide and the barrier function is performed electronically.

Electrical engineers and computer scientists have recognized a need for optical-based barrier solutions that reduce the delays between the time the last thread reaches a barrier and when all processing elements receive notification that the barrier has been released.

SUMMARY

Various embodiments of the present invention are directed to optical-based barrier methods and systems for synchronizing processing of two or more threads. In one method embodiment of a barrier method, each thread can be processed by a different processing element. The method comprises transmitting a lightwave along a waveguide that is optically coupled to each of the processing elements. Each processing element that processes a thread turns on diverter capable of diverting substantially all of the lightwave from the waveguide. Each processing element that completes processing of a thread turns off a corresponding diverter. A barrier is reached when all of the processing elements have turned off the corresponding diverters and discontinued diverting a portion of the lightwave from the waveguide.

BRIEF DESCRIPTION OF THE DRAWINGS

FIG. 2A shows an isometric view of the first optical-based barrier system and a portion of a circuit board configured in accordance with embodiments of the present invention.

FIG. 2B shows a cross-sectional view of the first optical-based barrier system and the circuit board along a line 2B-2B shown in FIG. 2A in accordance with embodiments of the present invention.

FIGS. 3A-3D each show a snapshot of the first optical-based barrier system operated in accordance with embodiments of the present invention.

FIGS. 5A-5D each show a snapshot of the second optical-based barrier system operated in accordance with embodiments of the present invention.

DETAILED DESCRIPTION

Figure 1:
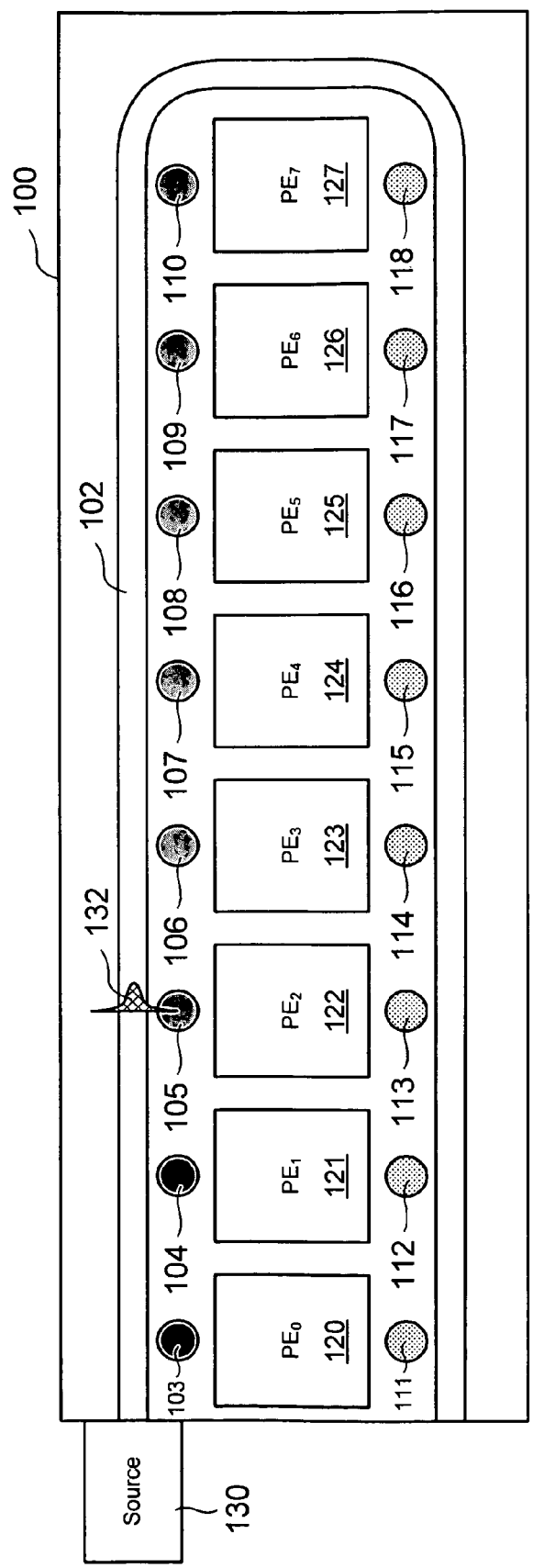
FIG. 1 shows a schematic representation and a top view of a first optical-based barrier system configured in accordance with embodiments of the present invention.

Various embodiments of the present invention are directed to optical-based barrier methods and systems for synchronizing processing of two or more threads. Method and system embodiments reduce the delay time between the last thread that reaches a barrier and when all processing elements receive notification that the barrier has been released over conventional methods and systems. The system embodiments include a bus waveguide that is optically coupled to a source that emits at least one continuous lightwave into the bus waveguide, where each lightwave has a different wavelength. The systems include one or more diverters that are optically coupled to the bus waveguide and are each electronically coupled to a corresponding processing element. Each diverter can be switched between a first state that is resonant with one of the lightwaves and a second state that is not resonant with any of the lightwaves. In addition, the system includes one or more detectors that are also optically coupled to the waveguide and are each electronically coupled to one of the processing elements. Each detector is configured to be resonant with one of the lightwaves.

In general, conventional barriers implemented in shared and distributed memory parallel computers have $O(\log_2 n)$ latency for an n-thread barrier. On the other hand, in the embodiments of the present invention, the notification travels over a waveguide with a length that scales as $O(\sqrt{n})$, which is less scalable than conventional barriers. However, the actual latency depends critically on the implementation technology. In particular, the latency of a software-based conventional barrier will be $K_1 \log_2(n)$ and the latency of embodiments of the present invention will be $K_2\sqrt{n}$, where $K_1$ is the time to fetch a shared cache line, read it, modify it, and replace it, which is hundreds of machine cycles and tens to as much as one hundred nanoseconds, while $K_2$ will be the time of flight of a photon in a waveguide that crosses a chip, about 2 cm, about two-tenths of a nanosecond. In addition, because embodiments of the present invention can be employed with on-chip thread counts n $n \leq 1024$, such that $\sqrt{n} \leq 3.2 \log_2(n)$. As a result, the latency is much shorter for embodiments of the present invention than for conventional software-based barriers.

In the following description, the term "lightwave" refers to unmodulated electromagnetic radiation of a particular wavelength that is not limited to the visible portion of the electromagnetic spectrum but can also refer to electromagnetic radiation with wavelengths outside the visible portion, such as the infrared and ultraviolet portions. The term "processing element" ("PE") refers to any hardware element in a parallel computing environment that executes a stream of instructions. The term "waveguide" refers to a structure for guiding electromagnetic radiation over long distances and on optical chips. For example, a waveguide can be an optical fiber, a ridge waveguide, or photonic crystal waveguide A number of structurally similar components comprising the same materials have been provided with the same reference numerals and, in the interest of brevity, an explanation of their structure and function is not repeated.

FIG. 1 shows a schematic representation and a top view of a first optical-based barrier system 100 configured in accordance with embodiments of the present invention. The system 100 comprises a bus waveguide 102, eight diverters 103-110, and eight detectors 111-118. In this embodiment, the waveguide 102 is U-shaped in order to form a partially enclosed inner region with the diverters 103-110 disposed along one inner edge of the waveguide 102 and the detectors 111-118 disposed along an opposing inner edge of the waveguide 102. The waveguide 102 is optically coupled to a source 130 that can be configured to emit one or more lightwaves into the waveguide 102, each lightwave having a different wavelength. The diverters 103-110 and the detectors 111-118 are disposed in close proximity to the waveguide 102 in order to lie within the evanescent field created by lightwaves propagating along the waveguide 102. For example, curve 132 represents the transverse intensity distribution of a lightwave propagating along the waveguide 102. The evanescent field represented by the outer regions of the curve 132 extends into the region outside the waveguide 102 occupied by the diverter 105. The system 100 also includes optoelectronic converter layers of eight PEs 120-127.

FIG. 2A shows an isometric view of the system 100 and a portion of a board 200 that supports the eight PEs 120-127 configured in accordance with embodiments of the present invention. FIG. 2B shows a cross-sectional view of the system 100 and the board 200 along a line 2B-2B shown in FIG. 2A in accordance with embodiments of the present invention. FIGS. 2A and 2B reveal that the PEs 120-127 are each comprised of an optoelectronic layer embedded within the system 100 and a processor layer disposed on the surface of the board

200. The optoelectronic layers can be configured with optoelectronic converters that convert lightwaves trapped by the detectors 111-118 into electrical signals that can be processed by the corresponding processing layers. For example, the detector 113 can be configured to extract a portion of a lightwave propagating along the waveguide 102. The optoelectronic layer 202 of the PE 122 may include an optoelectronic converter that converts the lightwave trapped in the detector 113 into an electrical signal that can be processed by the processing layer 204. The optoelectronic layers may include p-n junction or p-i-n junction photodetectors or other suitable optical-to-electrical signal converters. The board 200 can be a printed circuit board including signal lines that enable the PEs 120-127 to electronically communicate with other devices such as memory also located on the board 200. In other embodiments, the board 200 can be an optical layer including a number of waveguides optically coupled to the PEs 120-127 so the PEs 120-127 can optically communicated with other devices.

The system 100 may be fabricated in a single slab of suitable material. The slab 100 can be composed of a semiconductor such as Si or a compound semiconductor formed from a combination of group IIIA elements of the periodic table, such as Al, Ga, and In, and group VA elements of the periodic table, such as N, P, As, and Sb. GaAs, AsGaAs, InGaAs, and InGaAsP are examples of compound semiconductors. The system 100 can also be composed of a suitable dielectric material such as silica ($SiO_2$) and silicon nitride ($Si_3N_4$).

The diverters 103-110 are resonant with the wavelength of a lightwave propagating along the waveguide 102 when turned "on" by an electronically coupled PE. As a result, each of the diverters extracts via evanescent coupling nearly the entire lightwave from the waveguide 102 and traps the extracted lightwave within the diverter for a period of time. When a diverter is turned "off," the resonance wavelength of the diverter shifts away from the wavelength of the lightwave, and the lightwave continues propagating along the waveguide 102 past the diverter undisturbed. The detectors 111-118 are also resonators that are configured to have at least partial resonance with the wavelength of the lightwave propagating along the waveguide 102. As a result, each of the detectors 111-118 is able to extract via evanescently coupling a portion of the lightwave from the waveguide 102. Two types of the many different types of resonators that may be used for the diverters 103-110 and the detectors 111-118 are described in greater detail below in the subsections "Microring Resonators and Ridge Waveguides" and "Photonic Crystals and Resonant Cavities."

Figure 3A:
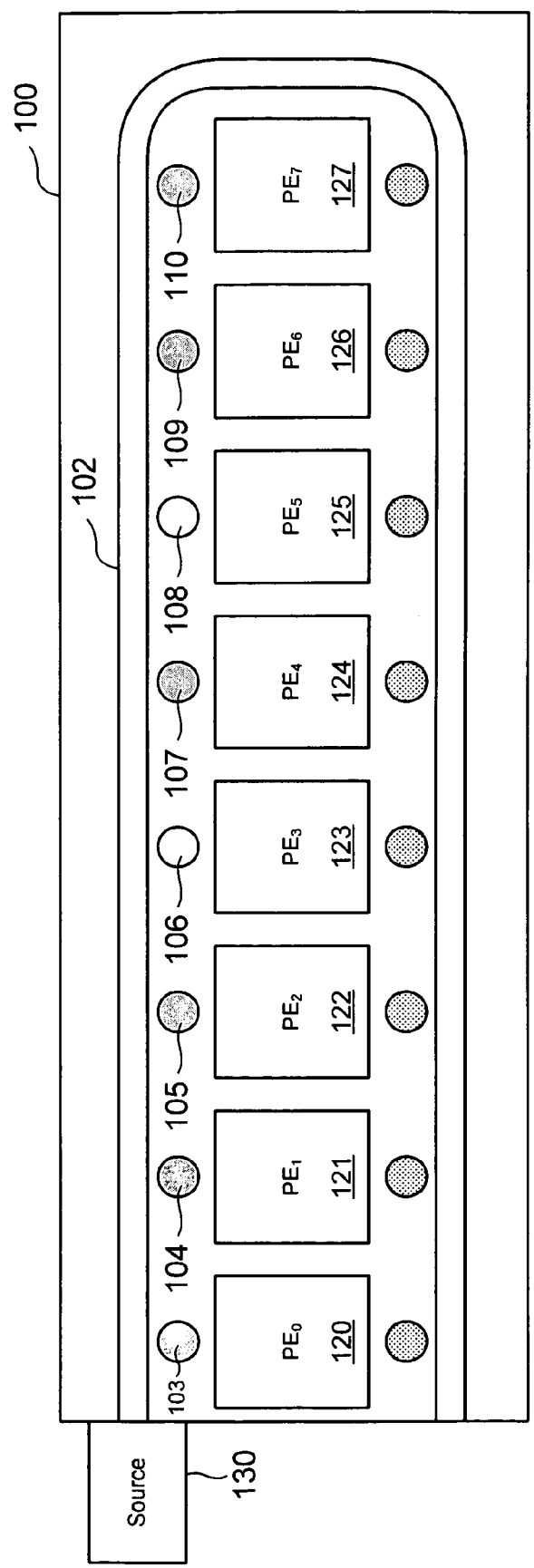

The system 100 can be configured to operate with barrier method embodiments that employ one barrier at a time to synchronize processing of a set of threads. This can be accomplished by configuring the diverters 103-110 and the detectors 111-118 to couple with a single wavelength of a lightwave emitted from the source 130. A method embodiment for using the system 100 to handle one barrier at a time is now described with reference to FIGS. 3A-3D. When a barrier is initialized, all of the PEs selected to process one thread of a multi-threaded process participate in the barrier by turning "on" their corresponding diverters. The PEs that are not selected to process one of the threads leave their corresponding diverters turned "off." In FIGS. 3A-3D, an unshaded diverter represents a diverter that is turned "off." For example, as shown in FIG. 3A, the six PEs 120-122, 124, 126, and 127 are selected to each process one thread of a 6-threaded process. These PEs respond by turning "on" the corresponding diverters 103-105, 107, 109, and 110. The PEs 123 and 125 not selected to process a thread leave their corresponding diverters 106 and 107 turned "off."

In FIG. 3B, while the selected PEs are each processing a thread, the source 130 emits a lightwave 302 of a particular wavelength into the waveguide 102. The diverters 103-110 are each configured to have a strong resonance with the wavelength of the lightwave 302 when the diverters 103-110 are turned "on." Because of the strong resonance, the turned "on" diverter located closest to the source 130 extracts substantially all of the lightwave 302 from the waveguide 102. For example, the diverter 103 is located closest to the source 130, and therefore the resonator 103 extracts substantially all of the lightwave 302 as represented by directional arrow 304.

When each selected PE completes processing a thread, it turns "off" its corresponding diverter. Because each thread may be different, the time at which each thread reaches the barrier may be different. FIG. 3C shows a snapshot during processing where the threads processed by the selected PEs 121, 124, and 127 have already reached the barrier and the PEs 121, 124, and 127 have turned "off" their corresponding diverters 104, 107, and 110. In the mean time, the threads being processed by the selected PEs 120, 122, and 126 have not yet reached the barrier and the PEs 121, 124, and 127 leave their corresponding diverters 103, 105, and 109 turned "on." FIG. 3C also reveals that because PEs 120 and 121 have completed processing threads, the corresponding diverters 103 and 104 are turned "off" and substantially all of the lightwave 302 is extracted by the diverter 105, which is the closest turned "on" diverter to the source 130.

Figure 3D:
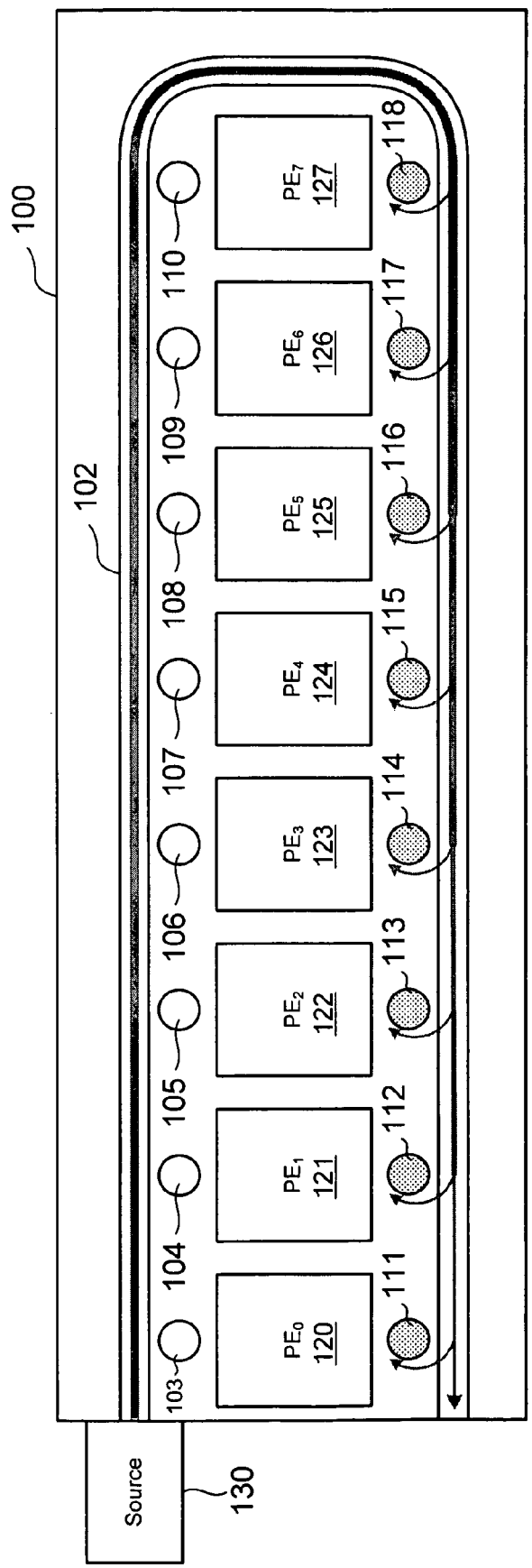

The six threads are processed when all six of the threads have reached the barrier and the selected PEs have turned "off" their corresponding diverters, and all of the detectors 111-118 are able to extract a portion of the lightwave 302 from the waveguide 102. FIG. 3D reveals how the system 100 appears when all six of the threads reach the barrier in accordance with embodiments of the present invention. The threads processed by the selected PEs 120-122, 124, 126, and 127 have all reached the barrier and corresponding diverters 103-105, 107, 109, and 110 are turned "off." As a result, the lightwave 302 passes the diverters 103-110 undisturbed, and the detectors 111-118 simultaneously extract a portion of the lightwave 302 from the waveguide 102 and transmit a detection event to the PEs 120-127, respectively.

In practice, many programs consist of a number of different processes where each process may be multi-threaded and require a different barrier. Thus system and method embodiments are not limited to applications in which one set of threads is handled at a time. Instead embodiments of the present invention can be scaled-up to handle programs consisting of any number of different processes each of which is multi-threaded and has a different associated barrier. In one system and method embodiment, this can be accomplished by fabricating an optical-based barrier system having two or more sets of diverters and detectors where each PE is electronically coupled to one diverter and one detector of each set. Each set of diverters and detectors can be configured to have resonance with a different lightwave. For the sake of brevity and simplicity, one optical-based barrier system and method embodiment is now described for simultaneously handling two different multi-threaded processes, each of which has a different barrier.

Figure 4:
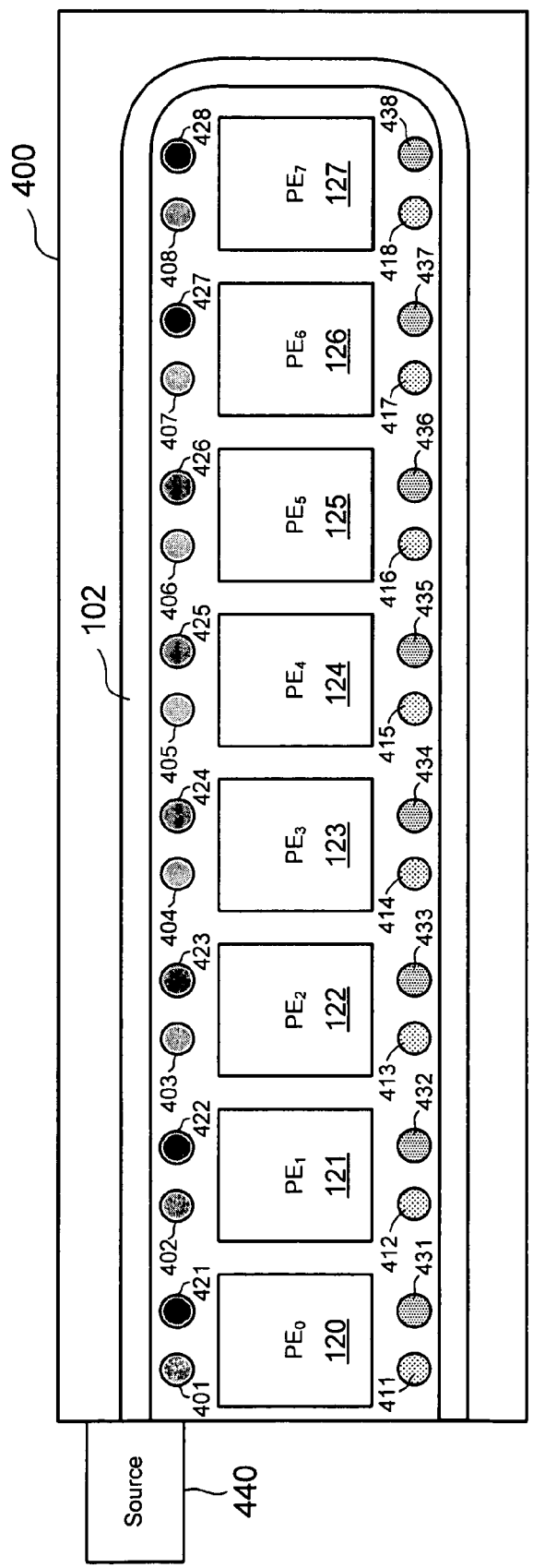
FIG. 4 shows a schematic representation and a top view of a second optical-based barrier system configured in accordance with embodiments of the present invention.

FIG. 4 shows a schematic representation and a top view of a second optical-based barrier system 400 configured in accordance with embodiments of the present invention. The system 400 comprises the same U-shaped bus waveguide 102, a first set of eight diverters 401-408 and a first set of eight detectors 411-418 that are configured to have resonance with a wavelength $\lambda_1$ of a first lightwave. The system 400 also includes a second set of eight diverters 421-428 and a second set of eight detectors 431-438 that are configured to have resonance with a wavelength $\lambda_2$ of a second lightwave. The first and second lightwaves are emitted by a source 440 and are each associated with a different barrier. The PEs 120-127 are electronically coupled to the diverters 401-408 and to the detectors 411-418, respectively, and the PEs 120-127 are also electronically coupled to the diverters 411-418 and to the detectors 431-438, respectively, as described above with reference to FIG. 1. For example, the PE 120 is electronically coupled to the diverters 401 and 421 and electronically coupled to the detectors 411 and 431. In order for the PEs 120-127 to send and receive data from other devices, the PEs 120-127 can also be electronically or optically coupled to a board (not shown) as described above with reference to FIG. 2.

Figure 5A:
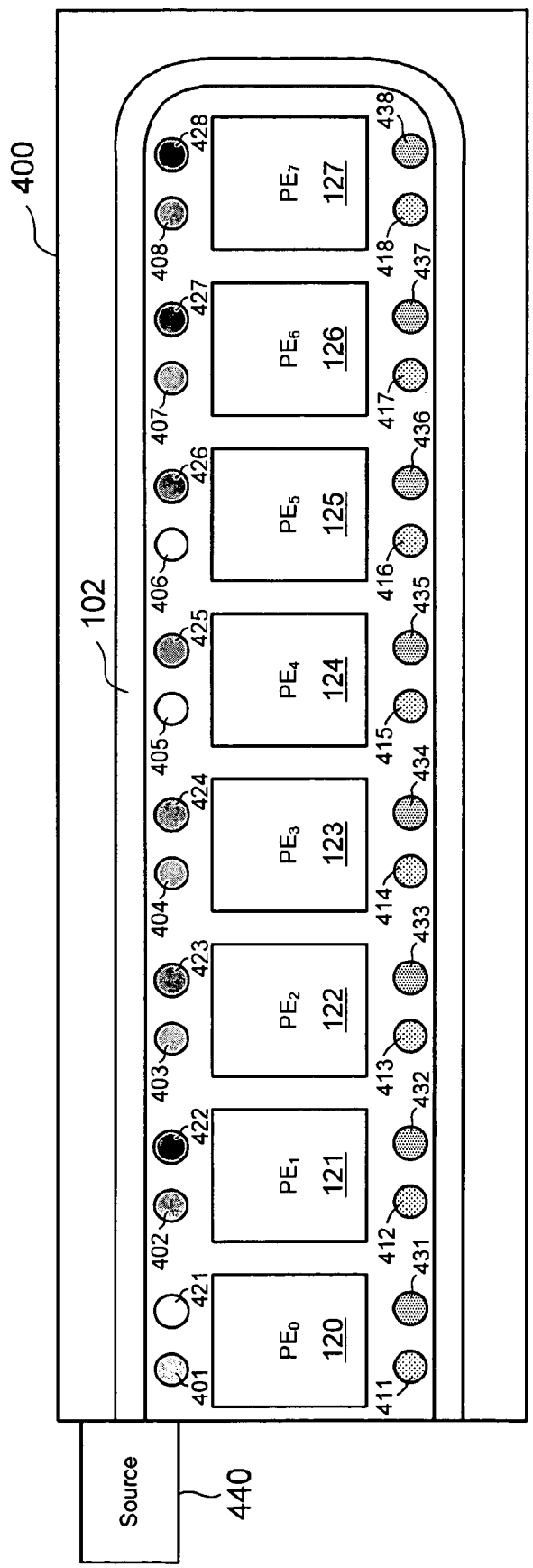

FIGS. 5A-5D show snapshots of the system 400 operated in accordance with embodiments of the present invention. Consider a first 6-threaded process and a second 7-threaded process that are simultaneously run on the selected PEs 120-127. Assume that the two multi-threaded processes are each associated with a different barrier and that the two barriers are initialized at the same time. As shown in FIG. 5A, the PEs 120-123, 126, and 127 are selected to each process one thread of the first 6-threaded process. These PEs respond by turning "on" the respective diverters 401-404, 407, and 408. The PEs 121-127 are selected to each process one thread of the second 7-threaded process. These PEs respond by turning "on" the respective diverters 422-428. Note that a number of the PEs 120-127, such as PE 121, are selected to simultaneously process one thread from the first and second processes. This can be accomplished when each of the PEs 120-127 is configured for thread-multiplexing, as in a multi-threaded processor. The PEs that are not selected to process a thread leave their corresponding diverters turned "off," which are represented by unshaded diverters.

In FIG. 5B, while the selected PEs each process one or two threads, the source 440 emits the first lightwave 502 of wavelength $\lambda_1$ and the second lightwave 504 of wavelength $\lambda_2$ into the waveguide 102. The first lightwave is used to establish a barrier for the first 6-threaded process, and the second lightwave is used to establish a barrier for the second 7-threaded process. Each of the diverters 401-408 is configured to have a strong resonance with the wavelength $\lambda_1$ when turned "on," and each of the diverters 421-428 is configured to have strong resonance with the wavelength $\lambda_2$ when turned "on." Because of the strong resonance associated with the diverters, the turned "on" diverters located closest to the source 440 extract the majority of the corresponding lightwaves. For example, the diverter 401 is the closest to the source 440 of the diverters having resonance with the first lightwave 502 and therefore extracts substantially all of the lightwave 502 as represented by directional arrow 506, The diverter 422 is the closest to the source 440 of the diverters having resonance with the second lightwave 504 and therefore extracts substantially all of the lightwave 504 as represented by directional arrow 508.

As described above for the method and system embodiments associated with the system 100, when each selected PE completes processing a thread for one of the two processes, it turns "off" its corresponding diverter. Because each thread may be different, the time at which each thread reaches one of the barriers may be different. FIG. 5C shows a snapshot where the threads processed by the selected PEs 120, 122, and 123 have already reached the first barrier and these PEs have turned "off" their corresponding diverters 401, 403, and 404. The threads processed by the selected PEs 121, 126, and 127 have not yet reached the first barrier and these PEs leave their corresponding diverters 402, 407, and 408 turned "on." FIG. 5C also shows that the threads processed by the selected PEs 121 and 122 have already reached the second barrier and these PEs have turned "off" their corresponding diverters 422 and 423, while the threads being processed by the selected PEs 123-127 have not yet reached the second barrier and these PEs have left the diverters 424-428 turned "on." FIG. 5C reveals that in this snapshot, the diverter 407 is the closest to the source 440 of the diverters having resonance with the first lightwave 502, and therefore, the diverter 407 extracts substantially all of the lightwave 502 as represented by directional arrow 510. The diverter 424 is the closest to the source 440 of the diverters having resonance with the second lightwave 504, and therefore, the diverter 424 extracts substantially all of the lightwave 504 as represented by directional arrow 512.

Figure 5D:
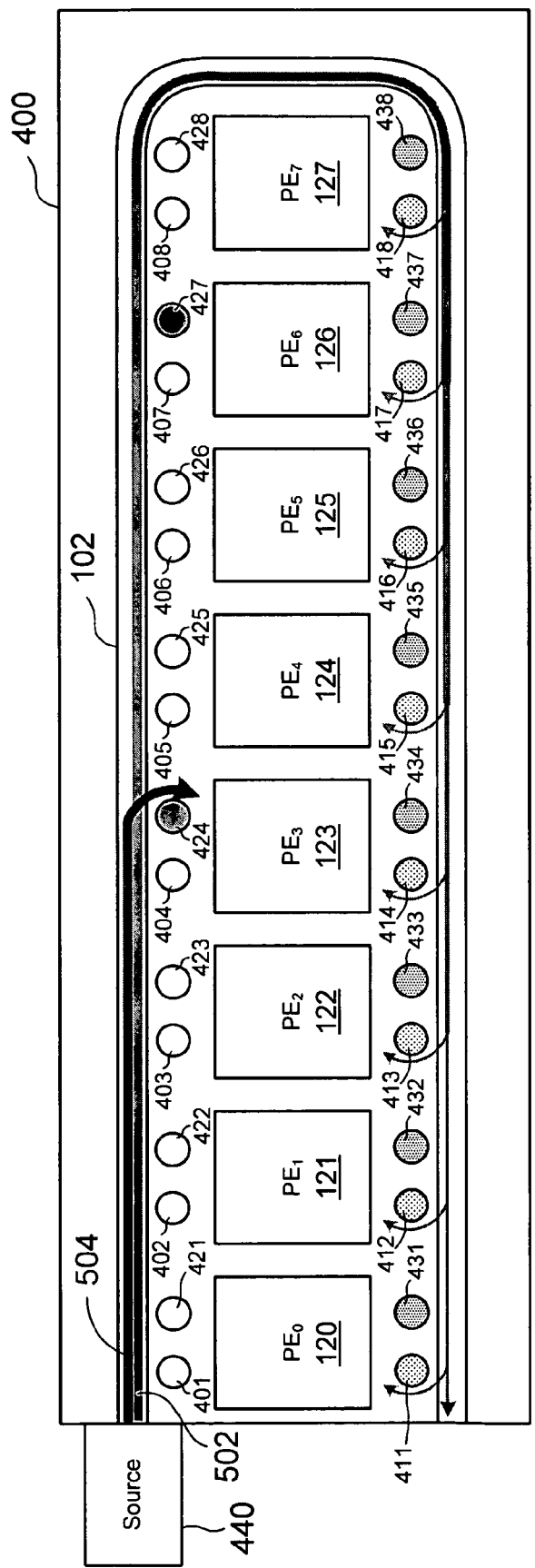

The 6- and 7-threaded processes are complete when all of the threads have reached the barrier and the corresponding PEs turn "off" their corresponding diverters, and all of the detectors are able to extract and transmit detection events to corresponding PEs. FIG. 5D reveals a snapshot of the system 400 when the six threads associated with the first process have reached the first barrier while not all of the threads associated with the second process have reached the second barrier. As a result, the selected PEs 120-123, 126, and 127 have all turned "off" their corresponding diverters 401-404, 407, and 408, and all of the detectors 411-418 simultaneously extract a portion of the first lightwave 502 from the waveguide 102 and transmit a detection event to the corresponding PEs 120-127. On the other hand, two threads of the second process are not finished and the diverter 424 continues to extract substantially all of the lightwave 504 from the waveguide 102. Note that while the PEs 123 and 126 continued to process threads of the second process, a third set of threads can be sent to any combination of the PEs for processing and a third barrier can be established.

In other system embodiments, the system 100 can be modified to handle multi-threaded processes with a number of different barriers. This may be accomplished by configuring the diverters 103-110 and the detectors 111-118 to be electronically tunable to a number of different wavelengths. For example, the 6-threaded and 7-threaded processes can be processed by a modified version of the system 100 where the diverters 103-110 and the detectors 111-118 are configured to be turned "on" and have resonance with the first lightwave 502 and the second lightwave 504 for different periodically applied voltage levels.

Figure 6:
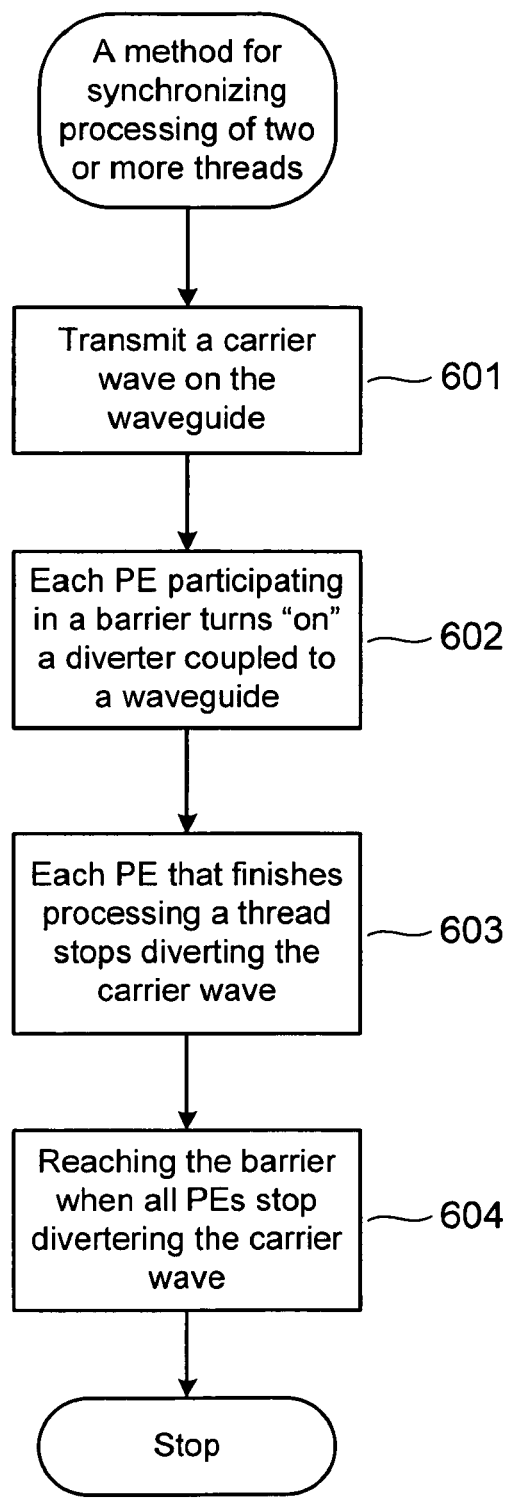
FIG. 6 is a control-flow diagram representing a number of steps in an optical-based barrier method of the present invention.

FIG. 6 is a control-flow diagram representing a number of steps in an optical-based barrier method of the present invention. In step 601, a source emits a lightwave, such as lightwaves 302, 502, and 504, onto the waveguide 102, as described above with reference to FIGS. 3B and 5B. In step 602, each PE assigned to process a thread and participate in a barrier turns "on" a corresponding diverter coupled to a waveguide, as indicated by shaded diverters in FIGS. 3A and 5A. The turned "on" diverter located closest to the source diverts substantially all of the lightwave from the waveguide, as described above with reference to FIGS. 3B and 5B. In step 603, each participating PE that finishes processing a thread turns "off" a corresponding diverter, as described above with reference to FIGS. 3C and 5C. In step 604, when the barrier is reached, all participating PEs have completing processing assigned threads and are no longer diverting the lightwave, as indicated by unshaded diverters 103-110 shown in FIG. 3D and unshaded diverters 401-408 in FIG. 5D. In addition, all of the PEs detect a portion of the lightwave using corresponding detectors that optically couple portions of the lightwave from the waveguide 102 as indicated by the detectors 111-118 in FIG. 3D and the detectors 411-418 in FIG. 5D.

Although system and method embodiments are described above with reference to eight processing elements, embodiments of the present invention are not so limited. Those skilled in the art will immediately recognize that system and method embodiments can be scaled up or down in order to accommodate any desired number of PEs. In addition, embodiments of the present invention are not limited to implementation in on-chip system 100 shown in FIGS. 1-5. Systems of the present invention can be used in larger scale settings. For example, all of the PEs on a board could be connected in a ring with optical fibers allowing the system to scale beyond a single package.

Microring Resonators and Ridge Waveguides

Figure 7A:
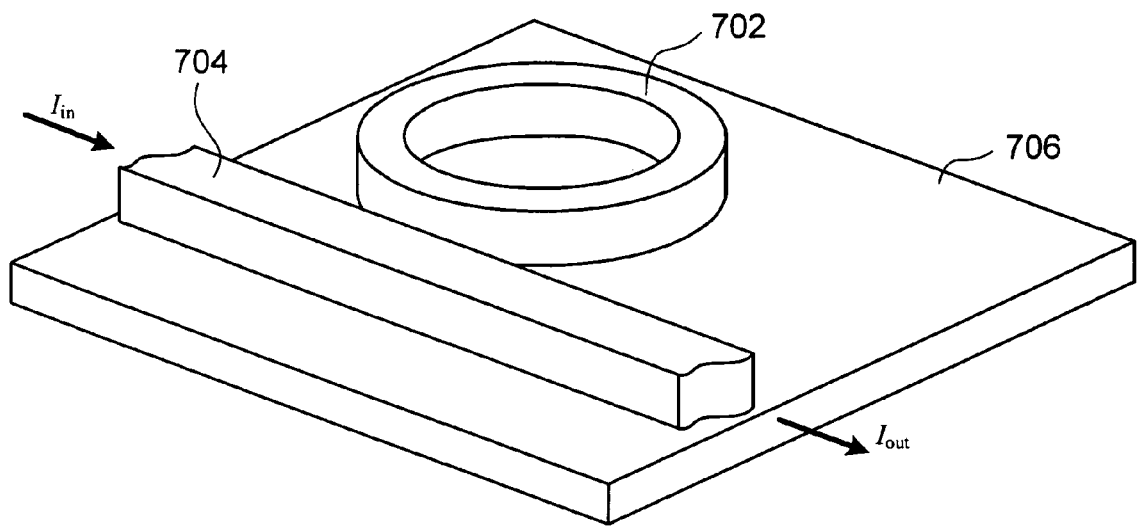
FIG. 7A shows an isometric view of a microring resonator and a portion of an adjacent ridge waveguide configured in accordance with embodiments of the present invention.

In certain system embodiments, the waveguide 102 can be a ridge waveguide, and the resonators used for the diverters and the detectors of the systems 100 and 400 can be microring resonators. FIG. 7A shows an isometric view of a microring resonator 702 and a portion of an adjacent ridge waveguide 704 disposed on the surface of a substrate 706 and configured in accordance with embodiments of the present invention. Lightwaves transmitted along the waveguide 704 are coupled from the waveguide 704 into the microring 702 when the lightwaves satisfy the resonance condition:

$$n_{eff}C = m\lambda$$

where $n_{eff}$ is the effective refractive index of the microring 702, C is the circumference of the microring 702, m is an integer, and $\lambda$ is the wavelength of a lightwave. In other words, lightwaves with wavelengths that are integer multiples of the wavelength 2 are coupled from the waveguide 704 into the microring 702.

Figure 7B:
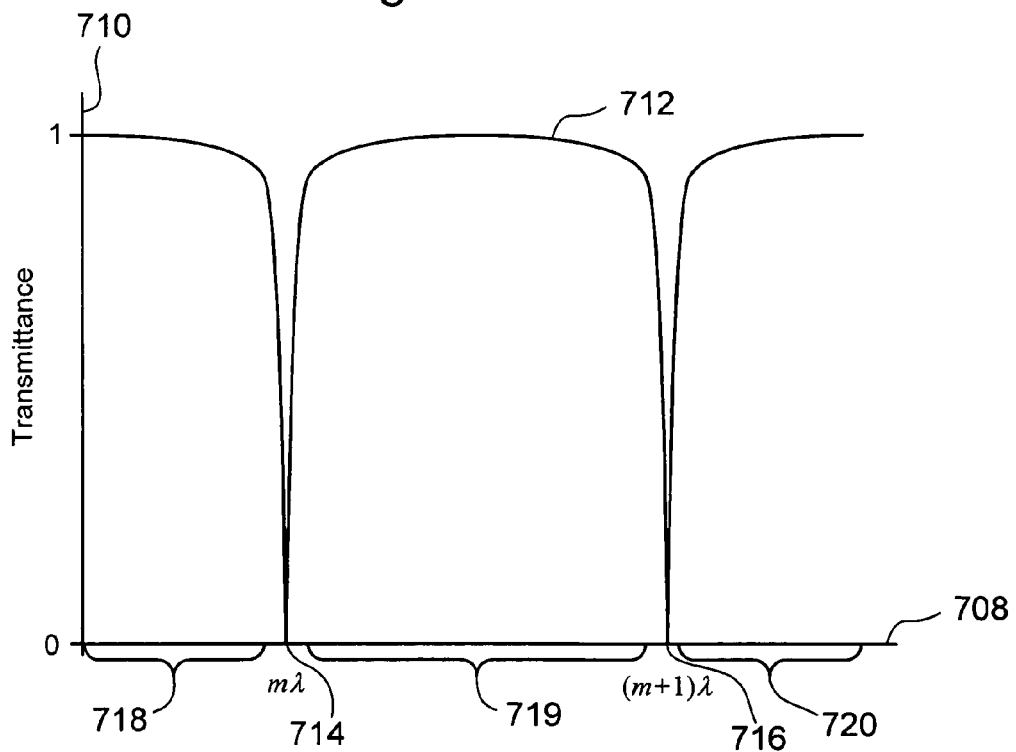
FIG. 7B shows a plot of transmittance versus wavelength for the waveguide shown in FIG. 7A in accordance with embodiments of the present invention.

FIG. 7B shows a plot of transmittance versus wavelength for the microring 702 and the waveguide 704 shown in FIG. 7A. Horizontal line 708 represents a wavelength axis, vertical line 710 represents a transmittance axis, and curve 712 represents the transmittance of lightwaves passing the microring 702 over a range of wavelengths. The transmittance of a lightwave passing the microring 702 is defined by:

$$T = \frac{I_{out}}{I_{in}}$$

where $I_{in}$ is the intensity of the lightwave propagating along the waveguide 704 prior to reaching the microring 702, and $I_{out}$ is the intensity of the lightwave propagating along the waveguide 704 after passing the microring 702. Minima 714 and 716 of the transmittance curve 712 correspond to zero transmittance for lightwaves having wavelengths $m\lambda$ and $(m+1)\lambda$ and represent only two of many regularly spaced minima. These lightwaves satisfy the resonance condition above, are said to have a "strong resonance" with the microring 702, and are coupled from the waveguide 704 into the microring 702. In the narrow wavelength regions surrounding the wavelengths $m\lambda$ and $(m+1)\lambda$, the transmittance curve 712 reveals a steep increase in the transmittance the farther the wavelength of a lightwave is away from the wavelengths $m\lambda$ and $(m+1)\lambda$. In other words, the strength of the resonance decreases and the portion of the lightwave coupled from the waveguide 704 into the microring 702 decreases the farther a lightwave's wavelength is away from an integer multiple wavelength of $\lambda$. Lightwaves with wavelengths in the regions 718-720 pass the microring 702 substantially undisturbed.

Figure 7C:
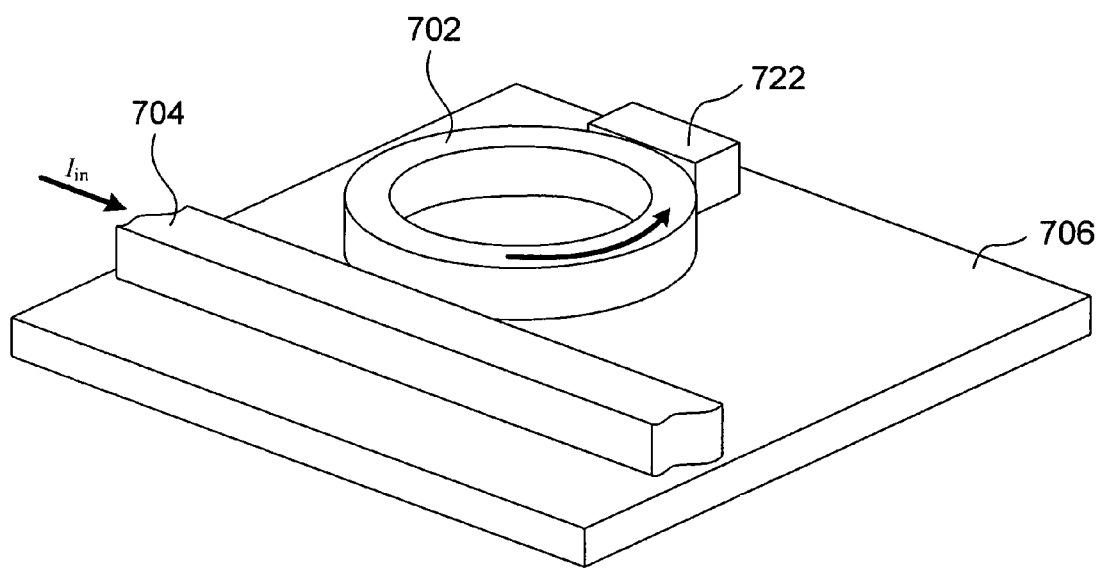
FIG. 7C shows a microring resonator used as a detector in accordance with embodiments of the present invention.

Because of the evanescent coupling properties of microring resonators, microring resonators can be used to detect particular lightwaves transmitting along an adjacent waveguide. FIG. 7C shows the microring resonator 702 used as a photodetector in accordance with embodiments of the present invention. A lightwave having a wavelength that is resonant with the microring 702 is evanescently coupled from the waveguide 704 into the microring 702 and remains trapped for a period of time while circulating within the waveguide 702. A detector 722 is disposed on the surface of the substrate 706 adjacent to the microring 702. The detector 722 absorbs the lightwave circulating in the microring 702 and converts the lightwave into an electronic signal that can be transmitted over signal lines to a corresponding PE. The detector 722 can be comprised of germanium ("Ge") or any other suitable light absorbing element or compound.

Figure 8:
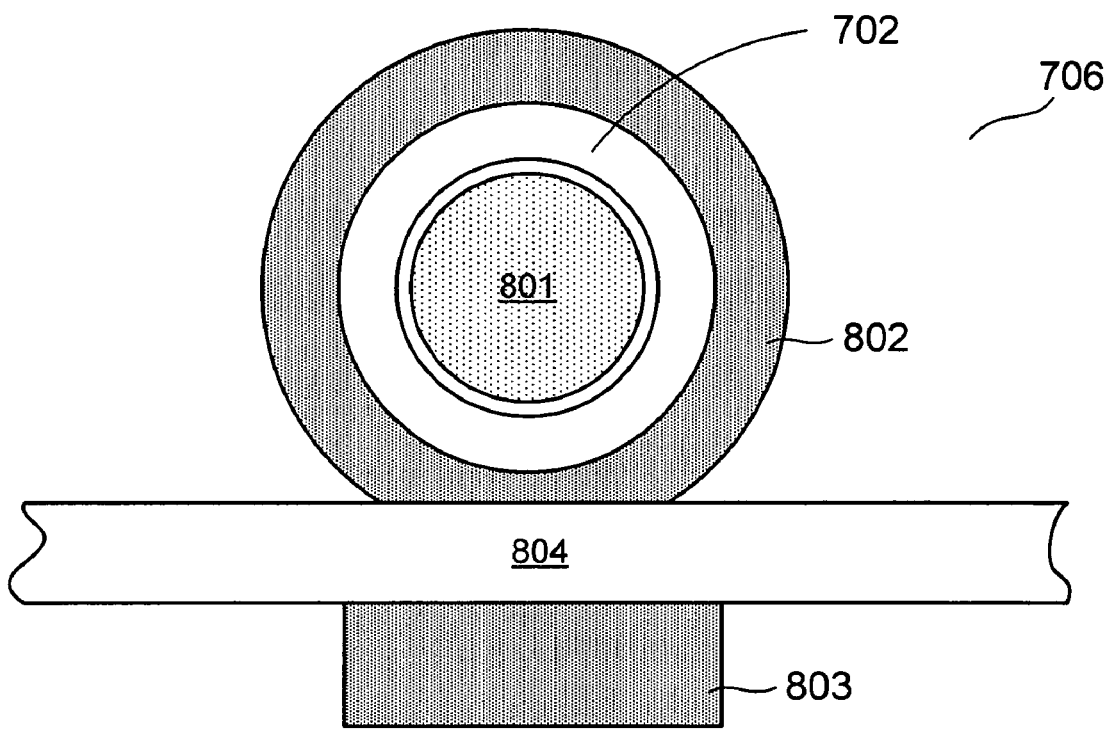
FIG. 8 shows a schematic representation and a top view of doped regions surrounding the microring resonator and the ridge waveguide shown in FIG. 6A in accordance with embodiments of the present invention.

The microring 702 can be electronically controlled by doping regions of the substrate 706 surrounding the microring 702 and waveguide 704 with appropriate electron donor and electron acceptor atoms or impurities. FIG. 8 shows a schematic representation and top view of doped regions surrounding the microring 702 and the ridge waveguide 704 in accordance with embodiments of the present invention. In certain embodiments, the microring 702 comprises an intrinsic semiconductor. A p-type semiconductor region 801 can be formed in the semiconductor substrate interior of the microring 702, and n-type semiconductor regions 802 and 803 can be formed in the semiconductor substrate 706 surrounding the outside of the microring 702 and on the opposite side of the waveguide 704. The p-type region 801 and the n-type regions 802 and 703 form a p-i-n junction around the microring 702. In other embodiments, the dopants can be reversed in order to form an n-type semiconductor region 801 in the substrate interior of the microring 702 and p-type semiconductor regions 802 and 803 in the substrate surrounding the outside of the microring 702.

The electronically controllable microring 702 can be configured to evanescently couple or divert light from an adjacent waveguide when an appropriate voltage is applied to the region surrounding the microring. For example, the electronically controlled microring 702 can be configured with a circumference C and an effective refractive index $n_{eff}'$ such that a lightwave with a wavelength $\lambda$ propagating along the waveguide 704 does not satisfy the resonance condition as follows:

$$n'_{eff}C \neq m\lambda$$

This lightwave passes the microring 702 undisturbed and the microring 702 is said to be turned "off." On the other hand, the microring 702 can be formed with suitable materials so that when an appropriate voltage is applied to the microring 702, the effective refractive index $n_{eff}'$ shifts to the refractive value $n_{eff}$ and the lightwave satisfies the resonance condition:

$$n_{eff}C = m\lambda$$

The lightwave is now coupled from the waveguide 704 into the microring 702 and the microring 702 is said to be turned "on." When the voltage is subsequently turned "off," the effective refractive index of the microring 702 shifts back to $n_{eff}'$ and the same lightwave propagates along the waveguide 704 undisturbed.

Photonic Crystals and Resonant Cavities

In certain system embodiments, the optoelectronic network switch can be implemented using two-dimensional photonic crystals where the waveguides are photonic crystal waveguides and the resonators are resonant cavities. Photonic crystals are photonic devices comprised of two or more different materials with dielectric properties that, when combined together in a regular pattern, can modify the propagation characteristics of lightwaves. Two-dimensional photonic crystals can be comprised of a regular lattice of cylindrical holes fabricated in a dielectric or semiconductor slab. The cylindrical holes can be air holes or holes filled with a dielectric material that is different from the dielectric material of the slab. Two-dimensional photonic crystals can be designed to reflect lightwaves within a specified frequency band. As a result, a two-dimensional photonic crystal can be designed and fabricated as a frequency-band stop filter to prevent the propagation of lightwaves having frequencies within the photonic bandgap of the photonic crystal. Generally, the size and relative spacing of cylindrical holes control which wavelengths of lightwaves are prohibited from propagating in the two-dimensional photonic crystal. However, defects can be introduced into the lattice of cylindrical holes to produce particular localized components. In particular, a resonant cavity, also referred to as a "point defect," can be fabricated to produce a resonator that temporarily traps a narrow wavelength range of lightwaves. A waveguide, also referred to as a "line defect," can be fabricated to transmit lightwaves with wavelengths that lie within a wavelength range of a photonic bandgap.

Figure 9:
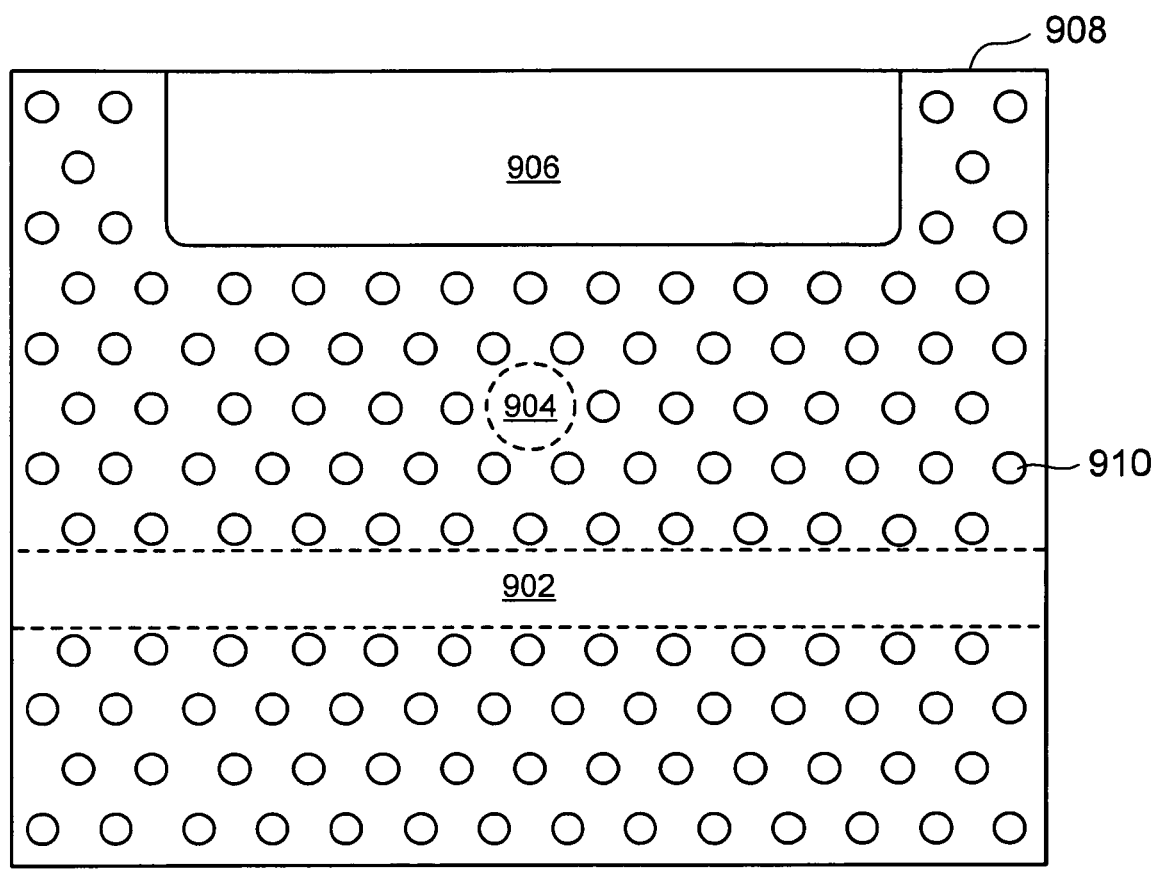
FIG. 9 shows a top view of a photonic crystal with a waveguide and a resonant cavity configured in accordance with embodiments of the present invention.

FIG. 9 shows a top view of a photonic crystal waveguide 902, a resonant cavity 904, portion of a PE 906 formed in a slab 908 in accordance with embodiments of the present invention. Circles, such as circle 908, represent holes that span the height of the slab 908. A resonant cavity can be created by omitting, increasing, or decreasing the size of a select cylindrical hole. In particular, the resonant cavity 904 is created by omitting a cylindrical hole. Photonic crystal waveguides are optical transmission paths that can be used to direct lightwaves within a particular wavelength range of the photonic crystal bandgap. Waveguides can be fabricated by changing the diameter of certain cylindrical holes within a column or row of cylindrical holes, or by omitting rows or columns of cylindrical holes. The waveguide 902 is created by omitting an entire row of cylindrical holes. The holes surrounding the resonant cavity 904 and the waveguide 902 form a two-dimensional Bragg mirror that temporarily traps lightwaves in the frequency range of the photonic crystal bandgap. Networks of branching waveguides can be used to direct lightwaves in numerous different pathways through the photonic crystal. The diameter of an electromagnetic signal propagating along a waveguide can be as small as $\lambda/3n$, where n is the refractive index of the slab, while a harmonic mode volume of a resonant cavity can be as small as $2\lambda/3n$.

Waveguides and resonant cavities may be less than 100% effective in preventing lightwaves from escaping into the area immediately surrounding the waveguides and resonant cavities. For example, lightwaves within a frequency range in the photonic bandgap propagating along a waveguide also tend to diffuse into the region surrounding the waveguide. Lightwaves entering the area surrounding the waveguide 902 or the resonant cavity 904 experience an exponential decay in amplitude in a process called "evanescence." As a result, the resonant cavity 902 is located within a short distance of the waveguide 902 to allow certain wavelengths of lightwaves carried by the waveguide 904 to be evanescently coupled from the waveguide 902 into the resonant cavity 904. Depending on a resonant cavity 904 Q factor, an extracted lightwave can remain trapped in the resonant cavity 904 and resonate for a while.

Figure 10A:
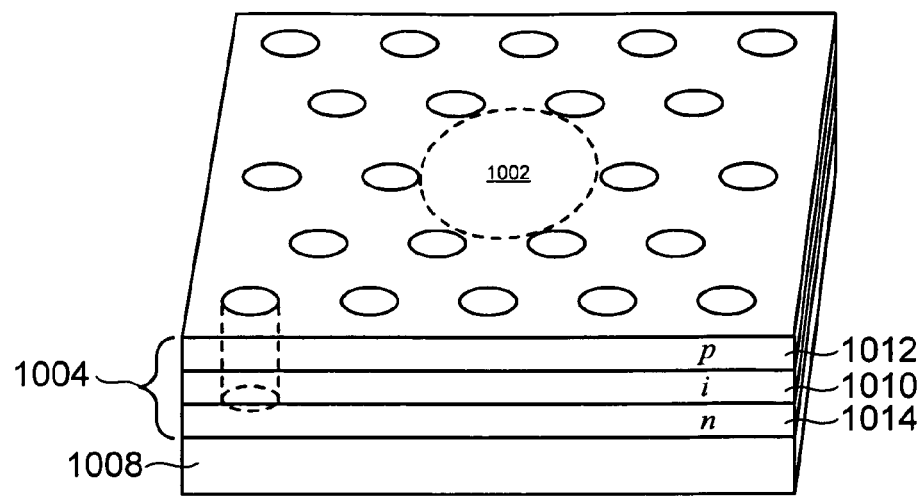
FIG. 10A shows an isometric view of a resonant cavity configured in accordance with embodiments of the present invention.

FIG. 10A shows a resonant cavity 1002 and portion of slab 1004 configured in accordance with embodiments of the present invention. The resonant cavity 1002 is created by omitting a cylindrical hole. The diameter of the resonant cavity 1002 and the pattern and diameter of cylindrical holes surrounding the resonant cavity 1002, such as cylindrical hole 1006, can be selected to temporarily trap a specific wavelength of a lightwave within the resonant cavity 1002. The slab 1004 is located on top of a glass substrate 1008. As shown in FIG. 10A, in certain embodiments, the slab 1004 may be comprised of an intrinsic layer 1010 sandwiched between a p-type semiconductor layer 1012 and an n-type semiconductor layer 1014 forming a p-i-n junction resonant cavity 1002.

Figure 10B:
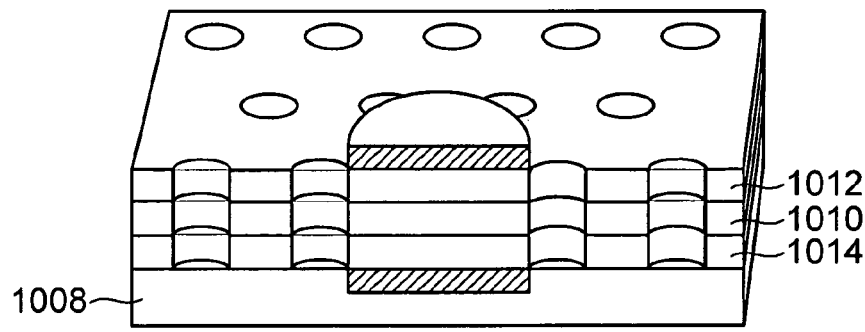
FIG. 10B shows a cross-sectional view of a first electronically controllable resonant cavity configured in accordance with embodiments of the present invention.

FIG. 10B shows a cross-sectional view of a first electronically tunable resonant cavity configured in accordance with embodiments of the present invention. The resonant cavity 1002 is sandwiched between two electrodes 1020 and 1022. The slab 1004 can be comprised of the p-i-n junction layers 1010, 1012, and 1014 or a single dielectric or semiconductor layer. Applying a voltage across the resonant cavity 1002 changes the effective refractive index of the resonant cavity 1002, which can be shift the resonant cavity 1002 into or out of resonance with a particular wavelength of a lightwave propagating in a nearby waveguide (not shown).

Figure 10C:
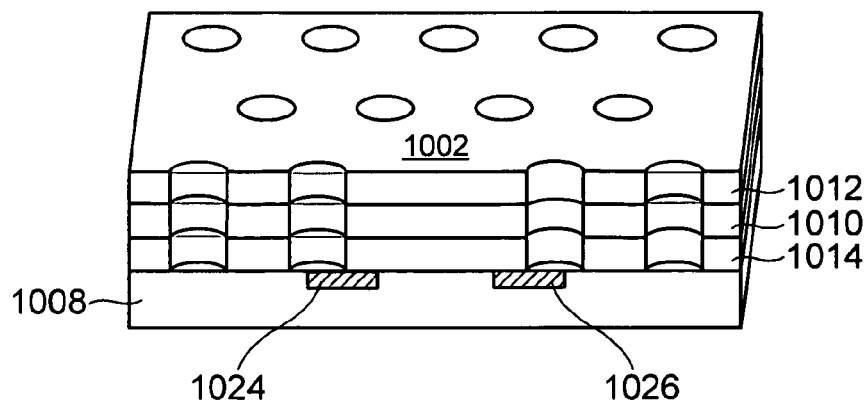
FIG. 10C shows a cross-sectional view of a second electronically controllable resonant cavity configured in accordance with embodiments of the present invention.

FIG. 10C shows a cross-sectional view of a second electronically tunable resonant cavity configured in accordance with embodiments of the present invention. The resonant cavity 1002 is disposed on two electrodes 1024 and 1026. The slab 1004 can also be comprised of the pin layers 1010, 1012, and 1014 or a single layer, such as a single dielectric or semiconductor layer. Applying a voltage across the resonant cavity 1002 changes the effective refractive index of the resonant cavity 1002, which can be shift the resonant cavity 1002 into or out of resonance with a particular wavelength of a lightwave propagating in a nearby waveguide (not shown).

Note that system embodiments of the present invention are not limited to microring resonators and photonic crystal resonant cavities. In other embodiments, any suitable resonator that can be configured to couple with a particular wavelength of a lightwave propagating along the waveguide 102 can be used.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for synchronizing processing of two or more threads that can each be processed by one of a number of processing elements, the method comprising:
   transmitting a lightwave along a waveguide that is optically coupled to each of the processing elements;
   turning on diverters corresponding to each processing element that processes a thread, wherein each turned on diverter is capable of diverting substantially all of the lightwave from the waveguide;

turning off diverters corresponding to each processing element that completes processing of a thread; and reaching a barrier when all of the processing elements have turned off the corresponding diverters and discontinued diverting a portion of the lightwave from the waveguide.

2. The method of claim 1 wherein turning on diverters for each processing element that processes a thread further comprises each processing element changing the effective refractive index of a corresponding diverter so that the diverter is capable of coupling substantially all of the lightwave from the waveguide.

3. The method of claim 1 wherein turning on diverters for each processing element that processes a thread further comprises coupling the lightwave from the waveguide into a resonator that is electronically coupled to a corresponding processing element.

4. The method of claim 3 wherein the resonator further comprises one of:
an electronically controlled microring resonator configured as a p-i-n junction; and
an electronically controlled photonic crystal resonant cavity configured as a p-i-n junction.

5. The method of claim 4 wherein the microring resonator further comprises one of:
a p-type semiconductor formed in the substrate interior of the microring and an n-type semiconductor formed in the substrate surrounding the microring; and
an n-type semiconductor formed in the substrate interior to the microring and a p-type semiconductor formed in the substrate surrounding the microring.

6. The method of claim 1 wherein turning off diverters corresponding to each processing element that completes processing of a thread further comprises each processing element disabling a corresponding resonator optically coupled to the waveguide so that the resonator cannot couple the lightwave from the waveguide.

7. The method of claim 1 wherein reaching the barrier further comprises detecting a portion of the lightwave by all of the processing elements.

8. The method of claim 7 wherein detecting a portion of the lightwave by all the processing elements further comprises coupling a portion of the lightwave from the waveguide into a resonator that is electronically coupled to a corresponding processing element.

9. The method of claim 8 wherein the resonator further comprises one of:
a microring resonator configured as a p-i-n junction; and
a photonic crystal resonant cavity configured as a p-i-n junction.

10. An optical-based system for synchronizing parallel computing, the system comprising:
one or more processing elements;
a waveguide having a first portion and a second portion, wherein the waveguide is optically coupled at an end of the first portion to a source and is arranged so that a lightwave to be emitted by the source into the first portion travels past each of the processing elements and subsequently enters the second portion to again travel past each of the processing elements;
one or more diverters, wherein each diverter is adjacent to the first portion of the waveguide and is electronically coupled to one of the processing elements, and each diverter can be switched by an electronically coupled processing element between resonance and non-resonance with the lightwave; and
one or more detectors, wherein each detector is adjacent to the second portion of the waveguide and electronically coupled to one of the processing elements, and each detector is partially resonant with the lightwave and extracts a portion of the lightwave from the waveguide.

11. The optical system of claim 10 wherein the waveguide further comprises one of:
a ridge waveguide;
a photonic crystal waveguide; and
an optical fiber.

12. The optical system of claim 10 wherein the source further comprises a multi-wavelength laser.

13. The optical system of claim 10 wherein the source further comprises a light-emitting diode.

14. The optical system of claim 10 wherein the diverter further comprises one of:
an electronically controlled microring resonator configured as a p-i-n junction; and
an electronically controlled photonic crystal resonant cavity configured as a p-i-n junction.

15. The optical system of claim 14 wherein the microring resonator further comprises one of:
a p-type semiconductor formed in the substrate interior of the microring and an n-type semiconductor formed in the substrate surrounding the microring; and
an n-type semiconductor formed in the substrate interior to the microring and a type semiconductor formed in the substrate surrounding the microring.

16. The optical system of claim 15 wherein the resonant cavity further comprises a p-type semiconductor layer and an n-type semiconductor layer.

17. The optical system of claim 10 wherein each diverter can be switched between resonance and non-resonance with the lightwave further comprises the electronically coupled processing element applying a voltage that changes the effective refractive index of the diverter.

18. The optical system of claim 10 wherein each detector is partially resonant with the lightwave further comprises each detector transmits an electrical signal to the corresponding processing element when the detector detects a portion of the lightwave.

19. The optical system of claim 10 wherein the detector further comprises one of:
a microring resonator; and
a resonant cavity.

* * * * *

UNITED STATES PATENT AND TRADEMARK OFFICE
CERTIFICATE OF CORRECTION

| | | |
|---|---|---|
| PATENT NO. | : 7,945,128 B1 | Page 1 of 1 |
| APPLICATION NO. | : 12/258674 | |
| DATED | : May 17, 2011 | |
| INVENTOR(S) | : Nathan Binkert et al. | |

It is certified that error appears in the above-identified patent and that said Letters Patent is hereby corrected as shown below:

On the title page, item (75), Inventors, in column 1, line 3, delete "Schraiber" and insert -- Schreiber --, therefor.

In column 14, line 37, in Claim 15, delete "a type" and insert -- a p-type --, therefor.

Signed and Sealed this
Twentieth Day of December, 2011

David J. Kappos
*Director of the United States Patent and Trademark Office*